(No Model.) 2 Sheets—Sheet 1.

W. H. & W. S. RAVENSCROFT.
MANUFACTURE OF ARTICLES FROM WOOD PULP.

No. 293,785. Patented Feb. 19, 1884.

Witnesses:
T. C. Brecht
J. C. Wildman

Inventors
W. H. Ravenscroft
W. S. Ravenscroft
Per L. W. Ginsabaugh
Attorney (No Model.) 2 Sheets—Sheet 2.
W. H. & W. S. RAVENSCROFT.
MANUFACTURE OF ARTICLES FROM WOOD PULP.
No. 293,785. Patented Feb. 19, 1884.
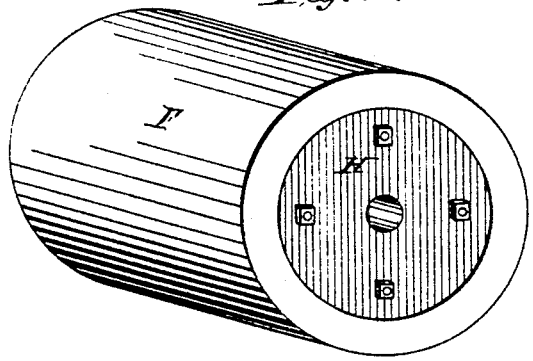
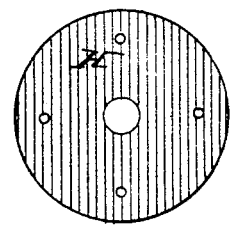
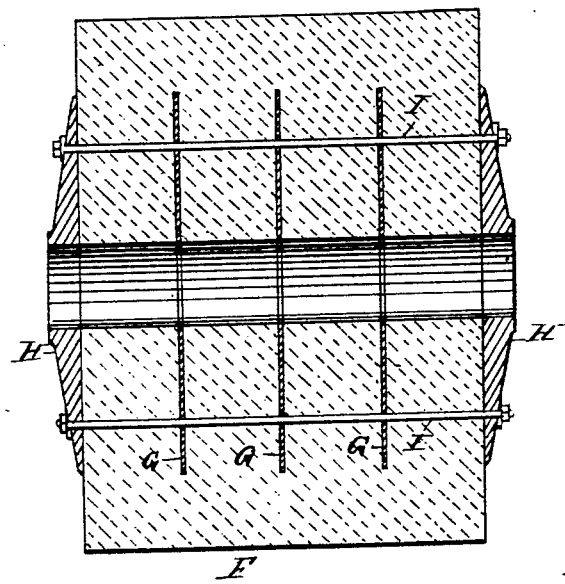
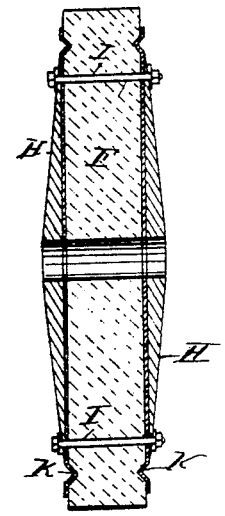
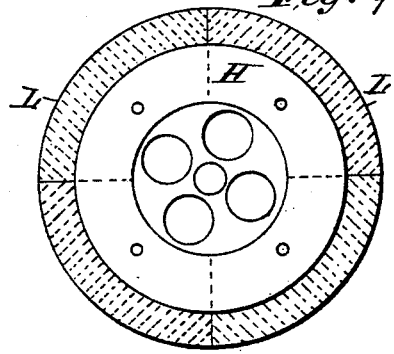
Witnesses:
Inventor:

UNITED STATES PATENT OFFICE.

WILLIAM H. RAVENSCROFT AND WALTER S. RAVENSCROFT, OF PARKERSBURG, WEST VIRGINIA.

MANUFACTURE OF ARTICLES FROM WOOD PULP.

SPECIFICATION forming part of Letters Patent No. 293,785, dated February 19, 1884.

Application filed December 27, 1883. (No model.)

*To all whom it may concern:*

Be it known that we, WILLIAM H. RAVENSCROFT and WALTER S. RAVENSCROFT, citizens of the United States, residing at Parkersburg, in the county of Wood and State of West Virginia, have invented certain new and useful Improvements in the Manufacture of Articles from Wood Pulp, of which the following is a specification, reference being had therein to the accompanying drawings.

Our invention relates to the manufacture of articles from wood pulp or fiber.

The object of our invention is to produce articles of various kinds and for various uses from a composition in which wood pulp or fiber is the base; and to this end our invention consists in a composition formed by the admixture of wood pulp or fiber and silicate of soda or other material which will combine with the wood fiber or pulp to unite the same, so it can be formed into a compact mass, the action of the silicate of soda upon the fiber or pulp being such that it chemically-changes the pulp or fiber into a petrified condition.

Figure 1:
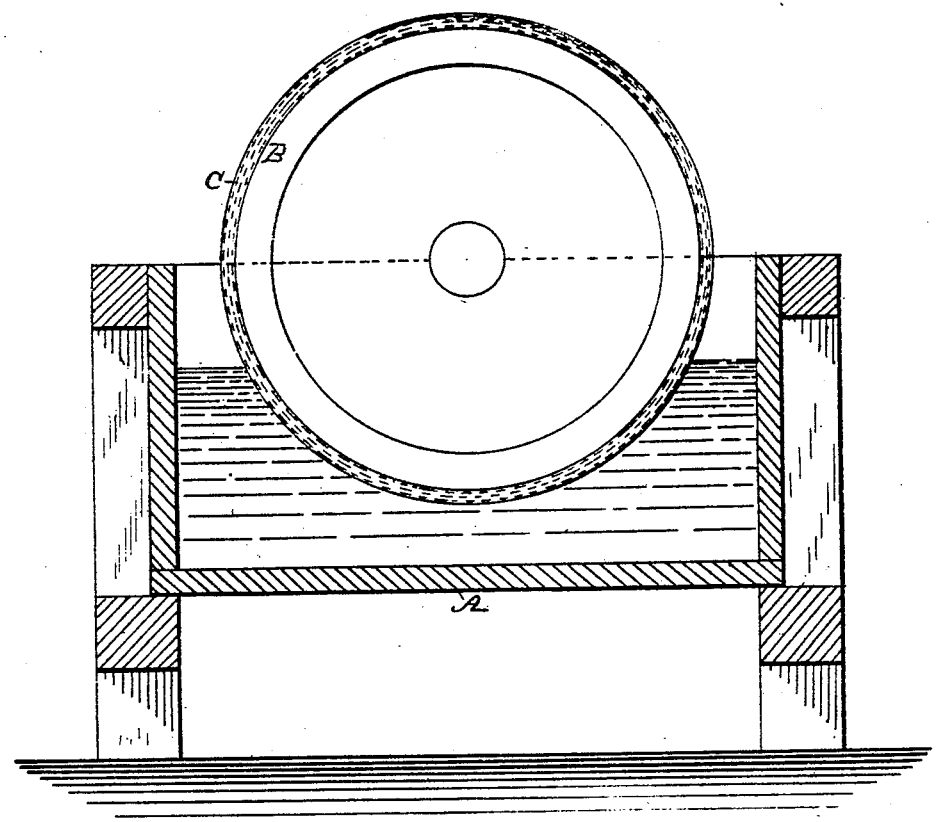
Figure 2:
Figure 3:
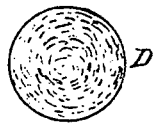
Figure 4:

Figure 1 is a sectional view of a tank and drum used for forming bats or felts from wood pulp and silicate of soda. Fig. 2 is a side view of a bat or felt of wood fiber or pulp and silicate of soda. Figs. 3 and 4 are top views of portions of the felt or bat cut to the desired configuration. Fig. 5 is a perspective view of a pulley-wheel made from our compound. Fig. 6 is a longitudinal sectional view of the pulley-wheel shown in Fig. 5. Fig. 7 is a side view of one of the thin plates used to strengthen the pulley-wheels. Fig. 8 is a sectional view of a wheel such as are used for wheelbarrows, trucks, &c., made from our composition, showing the manner of clamping and strengthening the same with metallic plates. Fig. 9 is a side view of a wheel made from sections or segments cut from the sheets of wood felt and joined together by clamping-plates.

Referring to the drawings, we have shown in Fig. 1 a suitable drum or cylinder revolving in a tank in which is placed the woody fiber or pulp in a plastic or semi-plastic condition. The cylinder gathers the pulp into a felt or bat of any desired thickness on its periphery, and a bat or felt of sufficient thickness is formed, which is removed from the cylinder and cut and pressed into the desired form.

Instead of using a cylinder and tank of the form shown, the bat or felt may be formed on what paper-makers call a "wet machine," in which an endless apron is used to take the pulp from the tank and deposit it on a roller until the bat or felt has attained the desired thickness.

We do not wish to limit ourselves to any particular form of machine for making the bat or felt of wood fiber or pulp, as many forms of machines will readily suggest themselves to a skilled mechanic; and, moreover, this forms no portion of our invention. We will now proceed to describe our invention, which we have found to be most practical.

The wood of any kind best adapted for the articles which are to be formed is reduced to a finely disintegrated and fibrous condition, the harder kinds of wood being preferred for articles which will be subjected to heavy or trying strains or loads, while the softer woods may be used for articles having less abrasion or weight to sustain. The wood fiber is mixed with a strong solution of silicate of soda or other analogous material which will combine with the woody fiber, to unite the same under pressure into a hard and compact mass, the action of the silicate of soda upon the wood fiber or pulp being such that it chemically changes it into a petrified condition. The silicate of soda is reduced to the proper degree of fluidity by any of the well-known solvents, and then mixed with the woody fiber until the mass is thoroughly saturated or impregnated with the silicate of soda and reduced to the desired consistency for being formed into felts or bats or molded into the form desired. We may in many instances take the composition of pulp and silicate of soda above described, while in a plastic state, and place it into molds of the desired form and subject it to the required degree of pressure to form the article without departing from the spirit of our invention. We prefer, however, to form the composition into bats of one or more inches in thickness, then cut therefrom blanks of the required size and form, and, by placing the desired number of such blanks into a conformator or mold, press the same into a compact mass of the desired form.

We do not wish to limit ourselves to any particular proportion of silicate of soda, as this may be varied within certain bounds; but we wish it understood that we do use a sufficient quantity of silicate of soda to harden or petrify the fibers of the wood which are interlaced and interwoven with the silicate of soda, and render it impervious to water.

In the drawings, A indicates the tank or vat, in which is mounted the cylinder or drum B, with a bat or web, C, of pulp formed thereon. The cylinder B is adapted to be revolved in its bearings at any desired velocity, so as to gather thereon the pulp and silicate of soda; but, as before stated, any other device or devices may be used to form the web or bat. When the bat or web is formed, it is cut and removed from the cylinder.

In Fig. 2 we have shown an edge view of a portion of a web or bat after it is taken from the cylinder. The web or felt thus formed may or may not be subjected to pressure between rolls to relieve it of any excess of moisture and to make the web or felt more dense and compact. The blanks which are to form the articles are cut from the web or felt while it is still in a moist or wet condition and placed in a mold with the necessary strengthening-disks of metal, (if such are used,) and then subjected to the required degree of pressure to form a solid or practically solid body.

In Fig. 3 we have shown a disk, D, as cut from the web or felt, while in Fig. 4 we have shown a segment of the rim of a wheel, E.

In Fig. 6 we have shown a pulley wheel or cylinder, F, as made from layers of the felt or bat of wood pulp or fibers.

G indicates metal disks placed between the layers of the bats or felts, to strengthen the cylinders or wheels. The metal disks are of a less diameter than the cylinder, so as to admit of the layers being pressed together at their peripheries, so as to make the wearing-surface of the cylinder practically solid.

H are heads or iron clamps which are held to the cylinders or drums by bolts I.

In Fig. 8 we have shown a wheel designed to be used for wheelbarrows, trucks, &c., which is stayed or strengthened by metal plates K, and the heads or clamps H and bolts I.

Fig. 9 is a side view of a wheel made up of segments L, formed from the compound web or felt clamped between the heads or clamps H.

We do not wish to confine ourselves to the manufacture of the articles given in illustration, as it is obvious that a great variety of articles can be produced from the compound herein described—as, for example, caster-wheels, pulley-wheels, wheels for trucks, fellies for carriages and wagons, toy blocks, paper-weights, and an endless variety of articles.

We are aware that silicate of soda has been used in the manufacture of paper, in a small quantity, as a sizing, and such we do not claim.

Having thus described our invention, what we claim is—

1. A bat or felt composed of wood pulp or fiber and silicate of soda, formed by depositing on a roller repeated layers of the composition as it is taken from the mixing vat or tank, as set forth.

2. The method herein described of forming articles from wood fiber or pulp and silicate of soda, the same consisting in forming bats or felts of the composition, cutting from said bats or felts blanks of the desired form and configuration, and then subjecting one or more of said blanks to the requisite pressure to form the article, as set forth.

3. A wheel composed of layers or blanks cut from a bat or thick web of wood fiber and silicate of soda, substantially such as described, said layers being joined together by pressure and by strengthening bars and disks, as set forth.

In testimony whereof we affix our signatures in presence of two witnesses.

WILLIAM H. RAVENSCROFT.
WALTER S. RAVENSCROFT.

Witnesses:
DANE D. JOHNSON,
WALTER A. LEESE.